Patented Feb. 13, 1934

1,947,008

UNITED STATES PATENT OFFICE 1,947,008

CELLULOSE DERIVATIVE COMPOSITION

Emmette F. Izard, Elsmere, Del., assignor to E. I. du Pont de Nemours & Company, Wilmington, Del., a corporation of Delaware No Drawing. Original application May 19, 1931, Serial No. 538,613. Divided and this application May 14, 1932. Serial No. 611,437

8 Claims. (Cl. 106—40)

This invention relates to new cellulose derivative compositions, and more particularly, to cellulose derivative compositions containing polyhydric alcohol esters of halogenated fatty acids as plasticizers. This application is a division of applicant's copending application Serial No. 538,613, filed May 19, 1931, "Esters of halogenated fatty acids and compositions including same."

An object of the present invention is to provide new cellulose derivative compositions having improved properties. A further and more particular object is to provide new cellulose derivative compositions especially advantageous for use as plastic or coating compositions. Other objects of the invention will be apparent from the description given hereinafter.

These objects are accomplished according to the present invention by the use of polyhydric alcohol esters of halogenated acids as plasticizers in cellulose derivative compositions.

The esters coming within the scope of the present invention may be prepared by reacting the polyhydric alcohols with the halogenated fatty acids at an elevated temperature, preferably between 80–270° C., and removing the water formed by said reaction at substantially the rate it is formed. This reaction may be carried out in the presence of a solvent for the reactants and a catalyst such as sulphuric acid, if desired.

In carrying out this reaction, the proportion of alcohol to acid may be varied greatly, but the acid should always be in slight excess of the amount required to combine with the alcohol to form the desired ester.

The following examples are given to illustrate the method of preparation of several of these esters:—

Example 1

Ethylene di-chloroacetate.—190 grams of glycol and 600 grams of chloracetic acid were heated together until the boiling point reached 250° C., and held at 250° C. until no more water was evolved. The mixture was cooled, poured into water, and washed with dilute potassium carbonate solution to remove the excess acid. The product was then distilled in vacuo, 545 grams distilling over between 165 and 190° C. at 10 mm. pressure.

Example 2

Glyceryl di-chloroacetate.—A mixture of 200 grams glycerol and 500 grams chloroacetic acid was heated until the boiling point reached 250° C., and was held at 250° C. until no more water was evolved. The mixture was treated as in Example 1, 370 grams distilling over between 195 and 215° C. at 6 mm. pressure.

Example 3

Glyceryl tri-chloroacetate (solution method).— A mixture of 92 grams glycerol, 290 grams chloroacetic acid, 50 grams toluene, and 2 cc. of sulfuric acid was heated to boiling in an apparatus designed to separate the water from the distillate and return the toluene to the distilling flask. The mixture was heated until water was no longer produced. The product was washed and distilled in vacuo as in Example 1.

Example 4

Diethylene glycol chloroacetate.—A mixture of 200 grams diethylene glycol and 400 grams chloroacetic acid was heated until the boiling point reached 250° C., and was held at 250° C. until no more water was evolved. The mixture was distilled in vacuo, 370 grams distilling over between 180 and 210° C. at 6 mm. pressure.

Example 5

Glyceryl di-bromoacetate.—A mixture of 33 grams glycerol and 100 grams bromoacetic acid was heated until the boiling point reached 250° C., and was held at 250° C. until no more water was evolved. The mixture was treated as in Example 1, 70 grams distilling over between 200 and 250° C. at 8 mm. pressure.

Example 6

Glyceryl di-bromopropionate.—A mixture of 30 grams glycerol and 100 grams alpha bromopropionic acid was heated until the boiling point reached 250° C., and was held at 250° C. until no more water was evolved. The product was treated as in Example 1, 85 grams distilling over between 210 and 260° C. at 4 mm. pressure.

Example 7

Glyceryl di-bromobutyrate.—A mixture of 27 grams glycerol and 100 grams alpha bromobutyric acid was heated until the boiling point reached 250° C., and was held at 250° C. until no more water was evolved. The product was treated as in Example 1, 70 grams distilling over between 200 and 260° C. at 3 mm. pressure.

Example 8

Sorbitol hexa-chloroacetate.—A mixture of 40 grams sorbitol and 100 grams chloroacetic acid was heated until the boiling point reached 170° C., and was held at 170° C. until no more water was evolved. The mixture was poured into water, the oily layer was dissolved in alcohol, enough calcium carbonate was added to neutralize the excess acid, and the solution was then decolorized with Carboraffin. After removal of the solvent, a pale amber colored syrup resulted.

*Example 9*

*Pentaerythritol di-chloroacetate.*—A mixture of 78 grams pentaerythritol and 92 grams chloracetic acid was heated until the boiling point reached 195° C., and was held at 195° C. until no more water was produced. The product was treated as in Example 8, a viscous amber oil resulting.

The esters disclosed in the above examples are more or less viscous oils having a water white to pale amber color. They are higher boiling and less soluble in water than esters prepared from the corresponding unsubstituted acids and are readily soluble in alcohol, acetone, ethyl acetate, butyl acetate, benzene, xylene, and the like solvents and diluents commonly used in cellulose derivative compositions adapted to be employed as plastics or lacquers. These esters are compatible when mixed in equal proportions with cellulose nitrate, cellulose acetate, benzyl cellulose, or ethyl cellulose, and give tough, flexible films. Films plasticized with these esters do not darken any more than films plasticized with dibutyl phthalate and other well known plasticizers, thus indicating the comparative stability of the halgen atoms in these esters. One of the most interesting and valuable properties of these plasticizers, however, is their ability to plasticize cellulose acetate films and render them substantially permanently flexible. Their excellent plasticizing action is further exemplified by the fact that they will allow the preparation of mixed cellulose acetate-cellulose nitrate compositions from which completely compatible films and molded articles can be made.

It is preferred to use polyhydric alcohols having from 2-6 carbon atoms inclusive and fatty acids having 2-4 carbon atoms inclusive, although the invention is not limited to such alcohols and acids, as alcohols and acids having a greater number of carbon atoms may be used. It is preferred to use chlorine or bromine as the halogen constituent of the fatty acid because of the availability and cheapness of these halogens, but fatty acids containing iodine or fluorine atoms are included within the scope of the invention. Preferably, monohalogen substituted fatty acids are used, and of these, those compounds in which the halogen is in the alpha position to the carboxyl group of the acid are preferred.

The following examples are given to illustrate cellulose derivative compositions including the esters above described:

*Example 10*

| | Parts |
|---|---|
| Cellulose nitrate | 12 |
| Damar | 3 |
| Glyceryl di-chloroacetate | 4 |
| Castor oil | 2.6 |
| Solvent | 166.5 |

*Example 11*

| | Parts |
|---|---|
| Cellulose nitrate | 12 |
| Damar | 3 |
| Ethylene chloroacetate | 6.6 |
| Solvent | 166.5 |

*Example 12*

| | Parts |
|---|---|
| Cellulose acetate | 12.0 |
| Diethylene glycol chloroacetate | 6.0 |
| Solvent | 182.0 |

*Example 13*

| | Parts |
|---|---|
| Cellulose nitrate | 12 |
| Pigment | 16.3 |
| Resin | 3.5 |
| Oil | 2.6 |
| Glyceryl di-chloroacetate | 4.0 |
| Solvent | 161.6 |

*Example 14*

| | Parts |
|---|---|
| Benzyl cellulose | 2 |
| Glyceryn tri-chloroacetate | 1 |
| Solvent | 12 |

The above lacquers and enamels give films which dry tack-free in five minutes, are tough and flexible, and are very durable.

*Example 15*

| | Parts |
|---|---|
| Cellulose nitrate | 1 |
| Cellulose acetate | 1 |
| Glyceryl di-chloroacetate | 1 |
| Solvent | 15 |

The above composition gives a tough, flexible film which is much less inflammable than ordinary cellulose nitrate films. The film is completely compatible, which shows the remarkable plasticizing effect the glyceryl di-chloroacetate possesses for cellulose esters, particularly the acetate. Similar compositions in which the glyceryl di-chloroacetate is replaced by one of the other esters hereinbefore described also gives compatible films of excellent properties.

By the term "solvent" used in the foregoing examples is included any of the well known solvent mixtures of alcohols, esters, such as ethyl, butyl, and amyl acetate, and hydrocarbons such as benzene, toluene, and xylene. The solvent mixtures can be varied widely as is well understood in the art.

Other plasticizers may be used to replace in part the plasticizers given in the foregoing examples. For instance, triacetin, dimethyl phthalate, acetanilide, triphenyl phosphate, and similar common plasticizers may be used in cellulose acetate compositions and camphor, dibutyl phthalate, and tricresyl phosphate may be used in the cellulose nitrate compositions. Also resins such as damar, ester gum, and various synthetic resins, such as the polyhydric alcohol-polybasic acid resins, may be used in these compositions.

The following examples are given to illustrate plastic compositions including the esters coming within the scope of the present invention:—

*Example 16*

| | Parts |
|---|---|
| Cellulose acetate | 100 |
| Glyceryl di-chloroacetate | 40 |

*Example 17*

| | Parts |
|---|---|
| Cellulose nitrate | 100 |
| Diethylene glycol chloroacetate | 35 |

*Example 18*

| | Parts |
|---|---|
| Ethyl cellulose | 100 |
| Glyceryl tri-chloroacetate | 20 |

Example 19

| | Parts |
|---|---|
| Cellulose butyrate | 100 |
| Diethylene glycol chloroacetate | 30 |

Example 20

| | Parts |
|---|---|
| Cellulose propionate | 100 |
| Glyceryl di-bromopropionate | 60 |

Example 21

| | Parts |
|---|---|
| Cellulose aceto-butyrate | 100 |
| Glyceryl di-bromobutyrate | 20 |

Example 22

| | Parts |
|---|---|
| Cellulose acetate | 100 |
| Glyceryl di-chloroacetate | 60 |
| Filler (including color) | 200 |

Example 23

| | Parts |
|---|---|
| Cellulose nitrate | 100 |
| Diethylene glycol chloroacetate | 50 |
| Filler (including color) | 200 |

Example 24

| | Parts |
|---|---|
| Cellulose nitrate | 100 |
| Cellulose acetate | 100 |
| Glyceryl di-chloroacetate | 90 |

The compositions illustrated in the above examples may be prepared with or without the usual volatile solvents or diluents, such as alcohol for the cellulose nitrate compositions, acetone for the cellulose compositions, and toluol-alcohol mixtures for the ether compositions. As in the case of the coating compositions, so with the plastic compositions, the plasticizers may be replaced in part by known plasticizers, if desired.

The compositions coming within the scope of this invention may be used for lacquers for coating metal and wood, dopes for coating fabrics, and in plastic compositions to be used in the preparation of toilet ware, novelties, sheeting, rods, tubes, and the like.

The use of these esters in cellulose derivative compositions is advantageous because of the fact that they are water-resistant and give water-resistant, tough, flexible films which retain their flexibility indefinitely due to the low vapor pressure of the esters. The use of these esters as plasticizers for cellulose acetate is particularly advantageous due to their exceptional plasticizing action on cellulose acetate. Also the fact that these esters can be used to produce completely compatible films comprising cellulose nitrate and cellulose acetate is a marked advantage, as such films are fire resistant and extremely tough and durable.

As many apparently and widely different embodiments of this invention may be made without departing from the spirit and scope thereof, it is to be understood that I do not limit myself to the specific embodiments thereof except as defined in the appended claims.

I claim:

1. A composition comprising a cellulose derivative and an ester formed by esterifying a halogenated fatty acid having from 2-4 carbon atoms, inclusive, with a polyhydric alcohol having from 2-6 carbon atoms, inclusive.

2. A composition comprising a cellulose derivative and glyceryl di-chloroacetate.

3. A composition comprising a cellulose derivative and glyceryl tri-chloroacetate.

4. A composition comprising a cellulose derivative and ethylene di-chloroacetate.

5. A composition comprising cellulose acetate and a polyhydric alcohol ester of a halogenated fatty acid, said acid having from 2-4 carbon atoms.

6. A composition comprising cellulose nitrate and a polyhydric alcohol ester of a halogenated fatty acid, said acid having from 2-4 carbon atoms.

7. A composition comprising a cellulose ether and a polyhydric alcohol ester of a halogenated fatty acid, said acid having from 2-4 carbon atoms.

8. A composition comprising cellulose acetate, cellulose nitrate, and a polyhydric alcohol ester of a halogenated fatty acid, said acid having from 2-4 carbon atoms.

EMMETTE F. IZARD.